J. J. MIDDLEBROOK.
MOTOR VEHICLE.
APPLICATION FILED FEB. 23, 1909.
958,519.
Patented May 17, 1910.
3 SHEETS—SHEET 1.
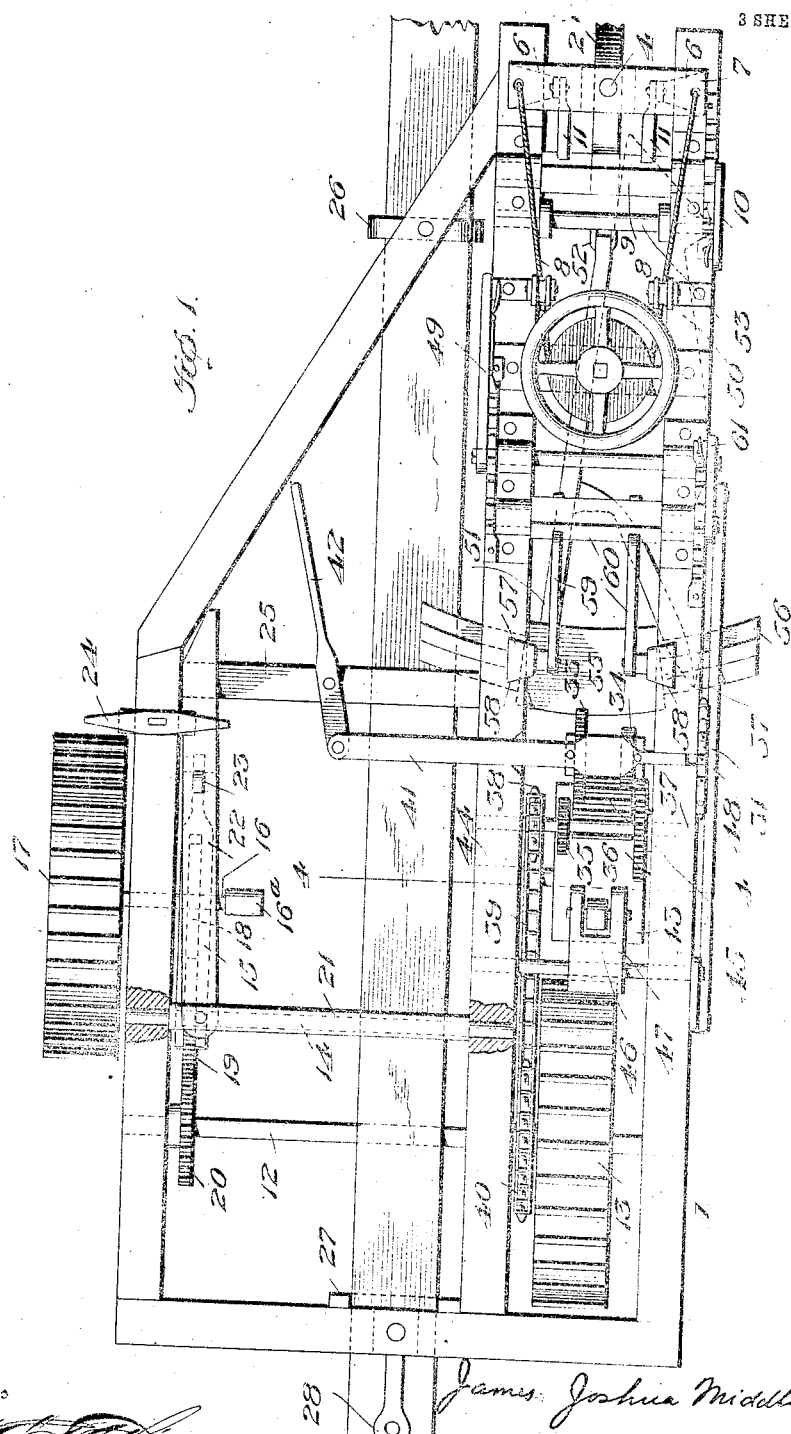

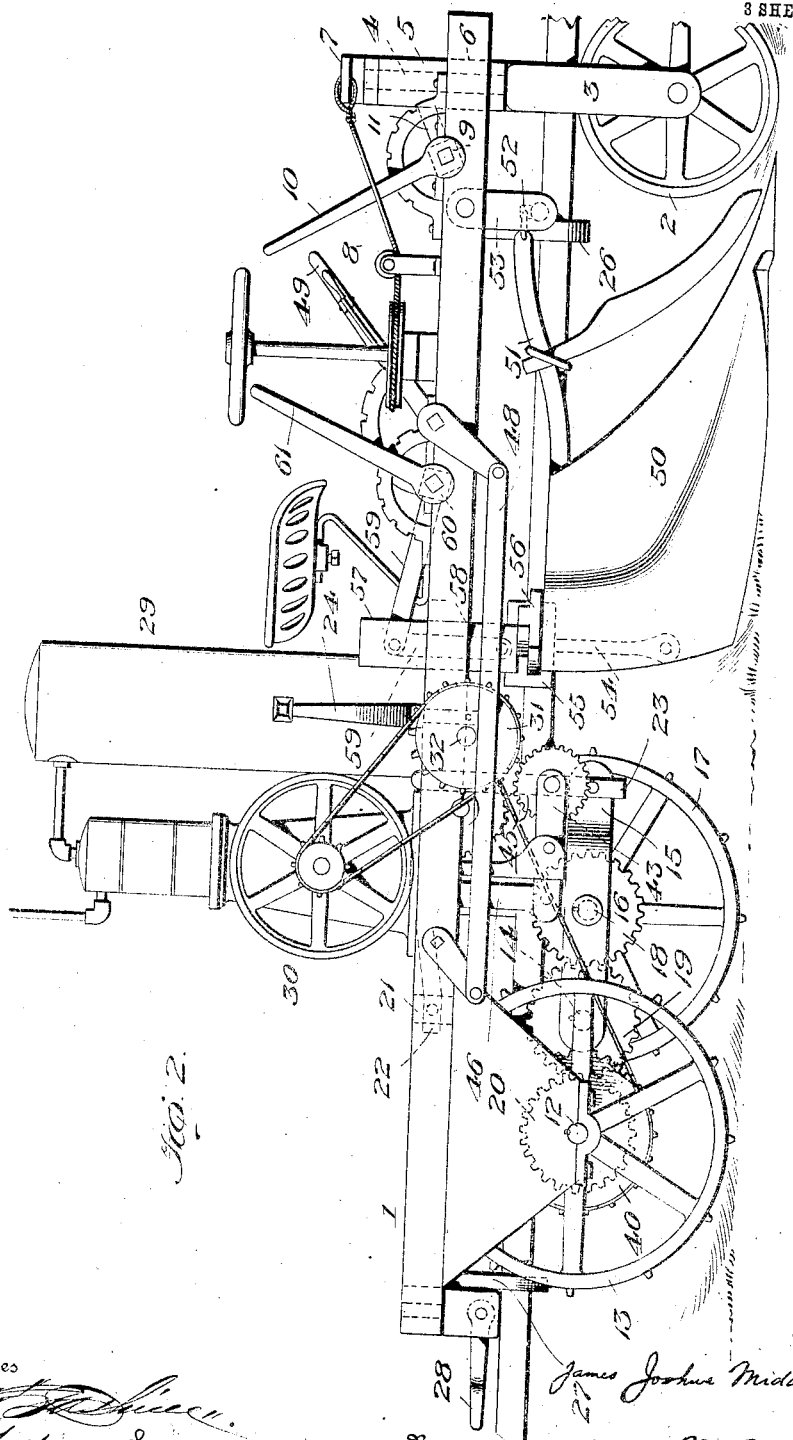

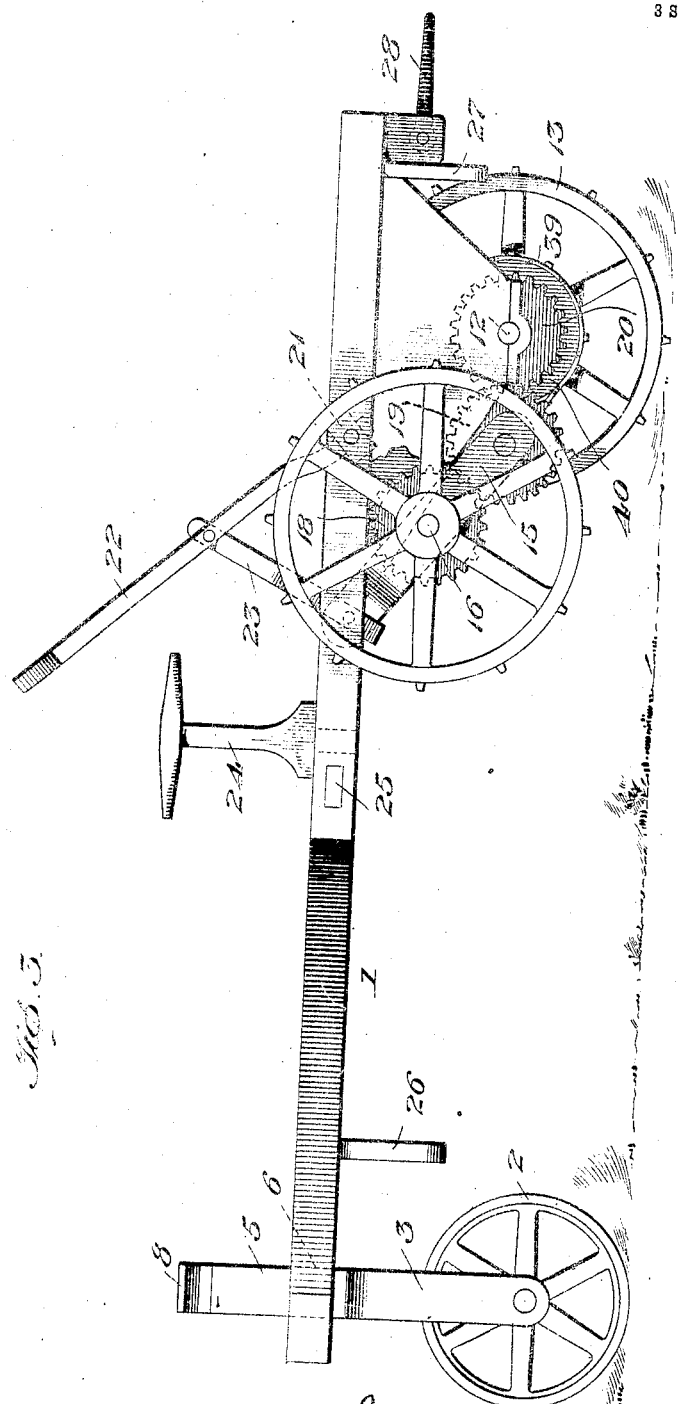

UNITED STATES PATENT OFFICE.

JAMES JOSHUA MIDDLEBROOK, OF SAULT STE. MARIE, MICHIGAN.

MOTOR-VEHICLE.

958,519.  Specification of Letters Patent.  Patented May 17, 1910.

Application filed February 23, 1909. Serial No. 479,316.

*To all whom it may concern:*

Be it known that I, JAMES JOSHUA MIDDLEBROOK, a subject of the King of Great Britain, residing at Sault Ste. Marie, county of Chippewa, and State of Michigan, have invented certain new and useful Improvements in Motor-Vehicles, of which the following is a specification.

My invention relates to motor vehicles.

The present invention has for its objects the provision of a motor vehicle, particularly adapted for operation by a gasolene engine, having novel traction wheels and gearing, whereby the machine may be readily arranged for plowing or for moving from place to place; novel driving means adapted for reversing, and other instrumentalities, all as fully set forth hereinafter and recited in the appended claims.

In the accompanying drawings: Figure 1 is a plan view of my improved motor vehicle; Fig. 2, a side elevation showing the same in operative connection with a gasolene engine; Fig. 3, a similar view from the opposite side of the machine showing the adjustable traction wheel in its elevated position.

The frame 1 of the machine is preferably of metal to afford rigidity and strength, and at its front it is provided with a steering wheel 2 carried in a yoke 3 which is provided with a stem 4 journaled in a sliding frame 5 which works in guides 6 in frame 1. Connected to the stem 4 above the crosspiece of frame 5 and thus supporting the steering wheel, is a head 7 which is operated by steering mechanism 8. A rocker 9, which is journaled in suitable bearings on frame 1 and operated by a lever 10, has articulated connections 11 with the lower part of frame 5, whereby the steering wheel may be raised and lowered and held at any desired position, thus regulating the depth of the furrow when the machine is used as a motor plow.

The rear part of the machine is carried by a shaft 12 mounted in depending brackets on frame 1 to which a traction wheel 13 is secured. A shaft 14 is carried by depending brackets on the frame 1 on which is loosely mounted a wheel carrier 15 in which is journaled a shaft 16 to which the other traction wheel 17 is secured. Shaft 16 carries a collar 16ᵃ on its inner end to retain said shaft against displacement. Keyed to the shaft 16 is a gear 18 which meshes with an idler gear 19 on shaft 14, the idler gear meshing with a gear 20 keyed to shaft 12. Connected to a rocker 21, which is journaled in frame 1, is a lever 22 which is attached to the wheel carrier 15 by a link 23. A horizontally movable catch 24 on frame 1 is adapted to be swung over the lever 22 and to hold its free end down upon a cross-bar 25, when it is desired, for the traction wheels 13 and 17 to propel the machine while it is going from place to place, but when the machine is used as a motor plow and the plowing operation is being carried on, the lever 22 is released by turning the catch 24, whereupon the wheel carrier 15 swings upwardly and the side of the frame 1 drops correspondingly until the shaft 16 strikes against the outer shaft supporting bracket of frame 1, the relative arrangement of the parts being then as shown in Fig. 3.

A yoke 26 at the front of frame 1 and a guide 27 at the rear thereof are for the reception of a tongue or pole of any implement, such as a harrow, for instance, which it may be desired to draw by the machine, and thus the machine is rendered adaptable as a tractor for any piece of farm machinery. A coupling 28 at the rear of frame 1 is used for attaching the machine to the implement which is to be drawn.

The gasolene tank is shown at 29 and the gasolene engine at 30, the latter being geared to a gear 31 secured to a shaft 32 on which are loosely splined large and small gears 33 and 34 which are adapted to mesh with either a small gear 35 or a large gear 36 fast on a shaft 37 which carries a sprocket wheel 38 connected by chain 39 to a sprocket wheel 40 fast on shaft 12. A gear shifter 41 operated by a lever 42 is employed for shifting the gears 33 and 34 on the shaft 32. By causing gear 33 to engage gear 35, the machine may be propelled faster, as when it is desired to move it from place to place without carrying on a plowing or other similar operation, but when the gear 34 is in mesh with the large gear 36, the necessary relatively slow travel of the machine is obtained to suit the requirements of plowing or other cultivation of the soil which may be carried on.

A rocker 43, which is carried by shaft 44, pivoted in hangers depending from frame 1, carries a reversing gear 45, which is adapted to mesh with the gear 36, the movement of the rocker 43 being controlled by a link 46 pivoted to a rocker 47, which is connected by a connecting rod 48 to a lever 49. Normally the gear 45 is out of mesh with gear 36, as shown in Fig. 2, but when it is in mesh with said gear, the gear 33 can be slid into engagement with said gear 45, thereby reversing the machine.

The motor vehicle is especially adapted for use as a support for a plow, although capable of any desired use. As illustrating one use, there is shown a plow 50 having beam 51 connected by the parts 52 and 53 to the frame 1 and also connected by parts 54, 55, 56, 57 and 58 to frame 1. Means 59, 60 and 61 may be used to adjust the plow.

The means for supporting and raising and lowering the plow form the subject-matter for my copending application Serial No. 505720, filed July 2, 1909.

Having thus described my invention, what I claim as new and desire to secure by Letters Patent, is:—

1. In a motor vehicle, the combination with a frame, and a motor, of a traction wheel supporting said frame, a carrier pivoted to the frame at a point off-set from the center of said traction wheel, a traction wheel carried by the said carrier, means for positioning the said carrier at different heights, a gear connected to the first-named traction wheel, and a gear carried by the said carrier for driving the last-named traction wheel and which is driven from the gear first-named.

2. In a motor vehicle, the combination with a frame, and a motor, of a traction wheel supporting said frame, a gear connected to said traction wheel, a carrier pivoted at a point off-set from the center of the traction wheel and adapted for upward swinging, a shaft carried by said carrier which is adapted to abut a part of the said frame to limit the upward swing of the carrier, means for raising or lowering the carrier and for holding it in different positions, a traction wheel carried by the shaft aforesaid and driven by a gear carried by the carrier and driven by the gear first-named.

3. In a motor vehicle, the combination with a frame and a motor, of a traction wheel supporting said frame, a carrier pivoted to the frame, a traction wheel carried by the carrier, means controlling the position of the carrier, and intermeshing gears one of which is carried by said carrier and operatively connecting the two traction wheels.

In testimony whereof, I hereunto affix my signature in presence of two witnesses.

JAMES JOSHUA MIDDLEBROOK.

Witnesses:
LEONE UFLAND,
J. O. COLWELL.